Sept. 12, 1939.  G. H. WILLIAMS  2,172,602
AUTOMATIC COUPLING DEVICE
Filed Feb. 28, 1938  2 Sheets-Sheet 2
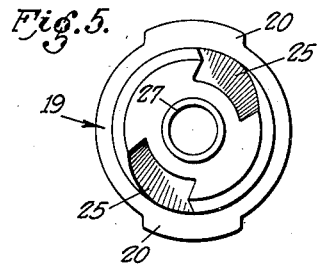
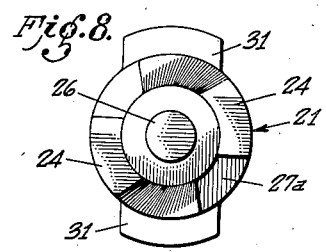
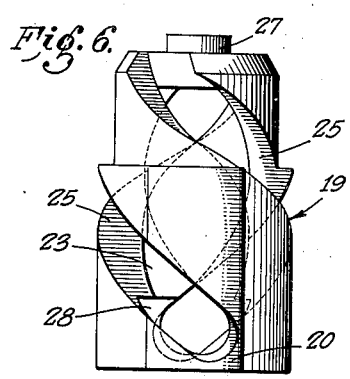
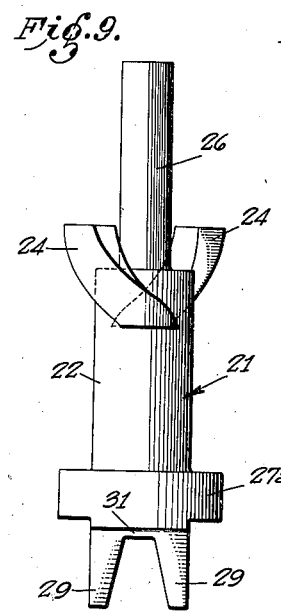
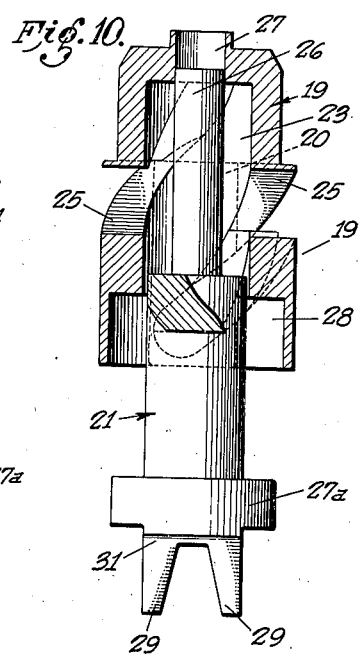
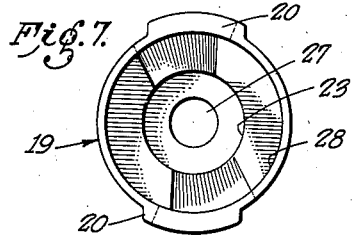
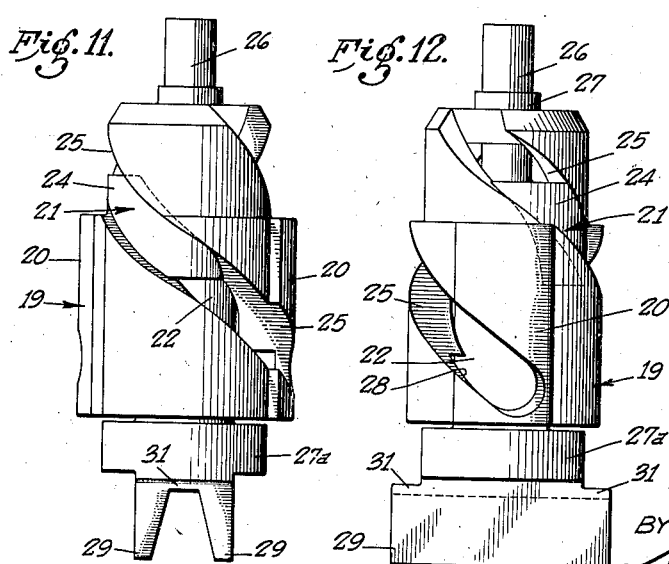
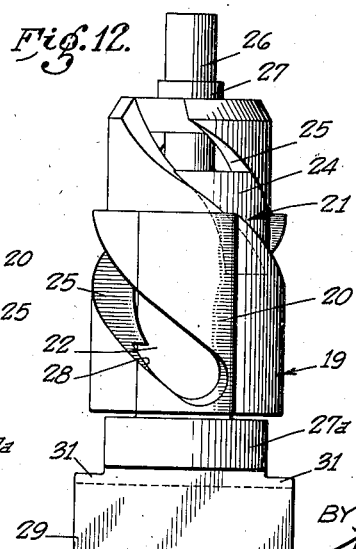
INVENTOR.
GLYNN H. WILLIAMS
BY
ATTORNEY.

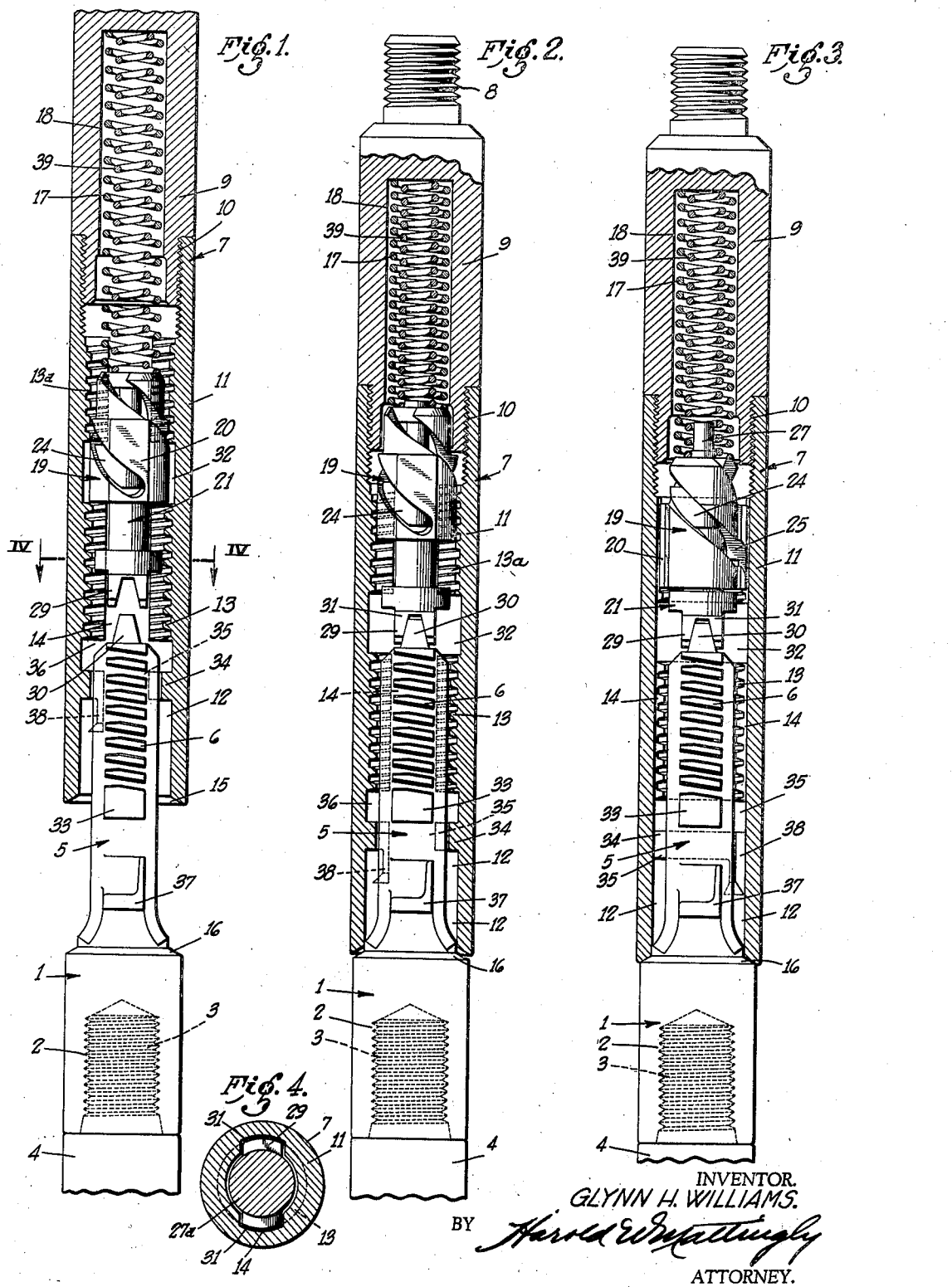

Patented Sept. 12, 1939

2,172,602

UNITED STATES PATENT OFFICE 2,172,602

AUTOMATIC COUPLING DEVICE

Glynn H. Williams, Huntington Park, Calif., assignor to Axelson Manufacturing Co., Los Angeles, Calif., a corporation of California Application February 28, 1938, Serial No. 193,038

12 Claims. (Cl. 255—28)

My invention relates to coupling devices particularly adapted for the interconnection of reciprocating rods or similar structures in which it is desired to make a readily detachable connection between two members permitting the transmission of reciprocating motion thereby without possibility of loosening or permitting lost motion between the members at the coupling.

While for purposes of ready understanding of the invention I have illustrated and described herein my invention as adapted for connecting sucker rod strings to oil well pumps, it will be understood by those skilled in the art that the principles of the invention may be readily adapted to many other uses.

In the operation of oil well pumps it is the common practice to locate a pump in the well and to operate the plunger or other reciprocating parts thereof by means of a string of sucker rods extending from the pump to the ground surface, such string of sucker rods being usually comprised by a series of sections, each of which is coupled to the adjacent section by means of threaded coupling members employing a right-hand thread. The lower end of the sucker rod string is then connected to the pump plunger or other reciprocating part so that when it becomes necessary to remove the sucker rods the pump plunger must be disconnected therefrom and considerable difficulty has been heretofore encountered in making such disconnection without loosening the joints between the sucker rod sections.

It is therefore an object of my invention to provide a coupling for sucker rods or similar devices in which two coupling members are employed adapted to be interengaged by a simple pressing of the two coupling members together.

Another object of my invention is to provide a coupling of the character set forth in which each of the coupling members is provided with interrupted threads or similar interengaging members and in which a simple pressing together of the coupling members will cause a partial rotation of one of the members to interengage the threads.

Another object of my invention is to provide a coupling of the character set forth in the preceding paragraph in which the rotational movement of one of the members is accomplished by means of a simple compression spring disposed with its axis extending in the direction of the longitudinal axis of the rods or other devices to be connected and in which the pressing together of the coupling members will store up forces in the spring for producing the rotational movement required to interengage the threaded portions of the couplings.

Other objects and advantages of my invention will be apparent from a study of the following specifications, read in connection with the accompanying drawings, wherein Fig. 1 is a vertical sectional view taken through a coupling constructed in accordance with my invention and showing the parts in their respective positions as the coupling members are moved one toward the other;

Fig. 2 is a vertical sectional view similar to Fig. 1 and illustrating the relative position of the parts of the coupling when the coupling members have been moved to a position immediately prior to the rotation of one of the members relative to the other;

Fig. 3 is a vertical sectional view similar to Figs. 1 and 2 and illustrating the relative position of the parts when the rotational movement has been completed and the coupling of the members together has been accomplished;

Fig. 4 is a horizontal sectional view taken along line IV—IV of Fig. 1;

Fig. 5 is a detail top plan view of a torsion cam which may be employed to produce rotational movement of the parts by means of a reciprocating motion of the cam relative to one of the coupling members;

Fig. 6 is a side elevational view of the torsion cam shown in Fig. 5;

Fig. 7 is a bottom plan view of the torsion cam shown in Figs. 5 and 6;

Fig. 8 is a top plan view of a driver cam cooperating with the torsion cam shown in Figs. 5, 6 and 7;

Fig. 9 is an elevational view of the driver cam shown in Fig. 8;

Fig. 10 is an assembly view illustrating the assembly of the torsion cam and driver cam in their normal or extended positions;

Fig. 11 is an elevational view of the assembled torsion cam and driver cam in their contracted or coupling engaged positions; and Fig. 12 is a side elevational view of the torsion cam and driver cam in their contracted or coupling engaged positions.

In United States Patent No. 2,066,956, issued to me on January 5, 1937, I disclosed a coupling including a stationary mandrel member and a movable socket member adapted to slide over and rotate relative to the mandrel member to interengage cooperating interrupted threads on the two members, permitting the coupling together of the members or ready detachment of the members from each other.

The present invention comprises an improvement over the coupling member disclosed in that patent and is illustrated herein as particularly adapted for connecting sucker rod sections together or for connecting a string of sucker rods to a pump or pump plunger. The coupling constructed in accordance with the present invention includes a mandrel member 1 comprising a stationary member of my coupling device and which is preferably provided with a suitable threaded box 2 adapted to receive the threaded pin 3 extending from a pump plunger or other reciprocating member 4 to which a string of sucker rods is to be coupled. The mandrel member 1 includes an upwardly projecting stem portion 5 substantially cylindrical in cross section and having formed thereon and projecting laterally therefrom interrupted threads 6.

The cooperating element of the coupling member comprises a socket 7 which may be secured at its upper end to a string of sucker rods as by means of a threaded pin 8 adapted to be screwed into the usual threaded box of a sucker rod section. The socket or movable element 7 of the coupling device may, for purposes of ready manufacture, be constructed in two pieces, the upper piece or bowl 9 which includes the pin 8 comprising a substantially cylindrical member threaded at its lower end as at 10 to be received in the upper end of a sleeve 11 comprising the lower piece or section of the socket 7. The sleeve 11 is provided with a longitudinally extending bore 12 preferably extending throughout the entire length of the sleeve 11 and having formed upon the interior thereof a series of interrupted threads 13 conforming with the interrupted threads 6 on the stem 5, the space or cut away portion 14 of the threads 13 providing a longitudinally extending groove on diametrically opposite sides of the bore 12 to constitute guideways through which the threads 6 may pass as the socket member 7 is lowered upon the stem 5. When the socket 7 has been lowered upon the stem 5 to a position aligning the threads 6 with the threads 13, a partial rotation of the socket 7 in a left-hand direction will interengage the threads 6 and 13 and positively connect the socket 7 with the mandrel member 1, such rotary movement drawing the socket member 7 down snugly upon the mandrel member 1 until the lower edge 15 of the socket 7 is brought into abutment with a shoulder 16 formed upon the mandrel member 1. When the parts are in this position (as shown in Fig. 3) it will be apparent that any movement of the sucker rod string to which the socket 7 is attached will be transmitted directly to the pump plunger 4 or other element to which the mandrel 1 is connected and no lost motion between the sucker rods and the pump plunger will be permitted.

In view of the fact that sucker rods or similar rod strings are usually constructed in sections connected together by means of right-hand thread couplings, it is undesirable to reversely rotate the sucker rod strings in order to connect or disconnect the sucker rod strings with the pump plungers or other devices to which they are to be connected since any such reverse rotation would tend to unscrew the joints of the sucker rod strings. I therefore provide means for interengaging the interrupted (preferably left-hand) threads 6 and 13 by a partial rotation of the socket member without requiring the sucker rod string to be positively rotated from the ground surface. I accomplish this result by providing one or more compression springs 17 in the socket 7 arranged to operate a torsion cam and a driver cam in such manner that the forces stored in the spring 17 by the mere lowering of the socket 7 upon the mandrel 1 will result in a rapid partial rotation of the socket as soon as the threads 6 and 13 have become properly aligned with each other.

As illustrated particularly in Fig. 1, the spring 17 may comprise a helical spring, the upper end of which may be seated in a longitudinal bore 18 in the bowl 9 while the lower end projects down into the sleeve 11 to engage the upper end of a torsion cam 19 so as to normally urge the torsion cam 19 downwardly in the sleeve against the upper ends of the threads 13. The torsion cam 19 is illustrated particularly in Figs. 5, 6 and 7 as comprising a substantially cylindrical member, having radially extending ridges 20 formed thereon of approximately the same width as the groove 14 to permit the torsion cam 19 to readily slide up and down in the socket 7, but which will prevent rotation of the torsion cam within the socket 7. For simplicity of manufacture, it is desirable that the threads 13 be tapped in the socket sleeve 11 from the upper end thereof and for that reason the upper portion of the sleeve 11 is illustrated as having a continuation 13a of the threads 13 formed therein though it will be understood by those skilled in the art that the threads 13a perform no function in the operation of the device.

Preferably the inner faces of the threads 13a are cut away to provide a somewhat enlarged diameter to the bore 12 conforming with the largest diameter of the torsion cam 19 to act as a guide therefor during the up and down movements of the torsion cam 19 in the socket 11. Thus the groove 14 may likewise be machined throughout the entire length of the threads 13a and 13 to provide the guide groove for the ridges 20.

The up and down movements of the torsion cam 19 is employed to rotate the socket 7 relative to the mandrel 1 as by employing a driver cam 21 having the shape particularly as illustrated in Figs. 8 and 9, the body portion 22 of which is of cylindrical cross section having an external diameter conforming in dimensions with a longitudinal bore 23 formed in and extending from one end of the torsion cam 19, the body portion 22 having projecting laterally therefrom a pair of helically shaped cam wings 24 adapted to be received in corresponding helical slots 25 in the torsion cam 19. The upper end of the driver cam 21 is preferably formed with a reduced diameter to comprise an upwardly projecting guide pin 26 adapted to be received in and to pass through a central bore or bearing 27 formed in the upper end of the torsion cam 19. The lower end of the driver cam 21 has an enlarged diameter as illustrated at 27a conforming in size with an internal recess or enlargement 28 of the bore 23 of the torsion cam 19 while upon the extreme lower end of the driver cam 21 a pair of downwardly extending fingers 29 are formed, adapted, as will be hereinafter more fully described, to engage a tongue 30 formed upon and extending upwardly from the upper end of the stem 5 of the stationary member of the coupling.

As is illustrated particularly in Figs. 10, 11 and 12, the torsion cam and the driver cam may be assembled as by inserting the driver cam 21 into the torsion cam 19 from the lower end thereof, engaging the cam wings 24 in the cam slots 25. Further movement of the torsion cam and driver cam toward each other will cause the cam wings 24 to slide upwardly in the helical slots 25 and such sliding movement will impart relative rotation between the torsion cam and the driver cam to position the two cam members as shown in Figs. 11 and 12. As shown in Fig. 12, the fingers 29 are preferably of such width that their outer ends 31 will extend into the grooves 14 in the threads 13 of the socket member 7 and rotary movement of the driver cam 21 will be prevented until the driver cam has been elevated in the socket 7 to a position disposing the fingers 29 in an enlarged recess 32 formed in the socket member 7 between the threads 13a and the threads 13.

It will also be noted that during such upward movement of the driver cam 21 the torsion cam 19 is also restrained from rotary movement and hence the torsion cam and driver cam will move upwardly as a unit, compressing the spring 17 as is shown particularly in Fig. 2. However, as soon as the driver cam arrives in such position that its fingers 29 are aligned with the recess 32, it is permitted to rotate and the forces of the spring 17 will move the torsion cam 19 downwardly, rotating the driver cam 21.

When the socket member 7 is to be coupled to the stationary member 1, it is merely lowered upon the stationary member 1, until the stem 5 thereof is received within the bore 12. Further lowering movement of the socket 7 will cause the fingers 29 to be engaged with the tongue 30, the engagement of the threads 6 with the groove 14 and the engagement of the fingers 29 with the groove 14 holding the tongue 30 and the fingers 29 in the positions shown in Fig. 1 during this lowering engaging movement. Further lowering of the socket member 7 after the fingers 29 and tongue 30 have been engaged will cause the driver cam 21 to move upwardly in the socket 7, raising the torsion cam 19 against the force of the spring 17 and compressing this spring. Now when the socket member 7 has been passed downwardly over the stem 5 to such position as to align the threads 13 with the threads 6, the driver cam will have been moved to the position shown in Fig. 2, releasing the fingers 29 from the groove 14 and freeing the driver cam for rotation.

To insure accuracy of alignment of the threads 6 and 13 before such rotary movement can be imparted, I prefer to provide a lug 33 on the stem 5 and to provide a radial flange 34 on the socket member 7, a portion of the flange 34 being cut away as indicated at 35 to form a continuation of the groove 14 while immediately above the flange 34 an annular recess 36 is provided in the socket member 7 through which the lug 33 may be freely rotated. Thus until the lower edge of the lug 33 clears the upper edge of the flange 34, the socket 7 is restrained against rotation relative to the stem 5 of the mandrel 1. But as soon as the lug 33 clears the flange 34, the socket 7 may rotate. This rotary movement will now be caused by the forces stored in the spring 17, depressing the torsion cam 19 and, by reason of the pitch of the cam wings 24 and the slots 25, the descent of the torsion cam will spin the torsion cam about the driver cam in a left-hand direction and, by reason of the engagement of the ridges 20 in the groove 14, the entire socket member 7 will be rotated in a left-hand direction, interengaging and tightening the threads 13 on the threads 6, moving the parts to the position shown in Fig. 3.

I prefer that the spring 17 be selected of such length and of such strength that when the coupling is engaged as shown in Fig. 3 there will be a sufficient amount of force remaining stored in the spring 17 to tend to urge the threads 6 and 13 into tight relation, and due to the pitch of the threads 6 and 13 the socket 7 will be drawn downwardly relative to the mandrel 1 to bring the lower end 15 of the socket into sealing relation with the shoulder 16 on the mandrel 1, the abutment of the end 15 and shoulder 16 insuring against lost motion in a longitudinal direction between the socket and mandrel members.

Now when it is desired to disconnect the sucker rods from the pump 4 or other device to which they have been coupled, a rotational movement imparted to the sucker rods in a right-hand direction (in a direction tending to tighten the joints in the sucker rod sections) will rotate the socket member 7 relative to the mandrel 1, such rotational movement causing rotation between the driver cam 21 and the torsion cam 19, such as to cause the torsion cam to rise to the position shown in Fig. 2 while at the same time such rotation will re-align the threads 6 of the mandrel with the groove 14, lugs 37 on the stem 5 at this time engaging stop lugs 38 on the socket 7 to prevent the parts from passing beyond such aligned positions. By merely elevating the sucker rods while holding them in their rotated position, the socket 7 will be lifted off of the mandrel member 1, the spring 17 moving the torsion cam downwardly to the position shown in Fig. 1 while the fingers 29 of the driver cam 21 are aligned with and may pass down in the groove 14.

It will therefore be observed that I have provided a relatively simple coupling device in which the mere lowering of the female coupling member or socket 7 upon the male or stationary coupling member 1 will cause the alignment of interrupted threads on these two members ready for interengagement upon a slight rotation of the socket member while at the same time the mere lowering of the socket member to this position stores up energy in a simple compression spring, imparting the necessary rotary movement as soon as the threads are accurately aligned with each other. Also it will be noted that a simple right-hand turning of the sucker rods or socket member will disconnect the threads 6 and 13 and permit the separation of the socket and mandrel members from each other, this operation resetting the torsion and driver cams to the correct position to permit a reconnection of the members upon a subsequent lowering of the socket upon the mandrel member.

It will be noted also that by reason of the employment of the torsion cam and driver cam arranged as illustrated and described herein, the entire forces required to impart the relative rotary motion may be provided by simple helical springs extending longitudinally of the device and hence permitting the employment of springs of such length and capacity as will insure sufficient rotary force to accomplish the desired results. As illustrated in Figs. 1, 2 and 3, the effect of the compression spring 17 may be reinforced and assisted by a second helical compression spring 39 of smaller diameter than the spring 17 and located within the spring 17. It will be understood by those skilled in this art that as many of such springs 17 and 39 as may be found desirable may be nested one within the other to produce the desired compression forces necessary to operate a coupling of any desired size.

While I have shown and described the preferred embodiment of my invention, I do not desire to be limited to any of the details of construction shown or described herein, except as defined in the appended claims.

I claim:

1. In a detachable coupling, a socket member, a mandrel member receivable in said socket, interengageable means on said socket and mandrel members for holding said members coupled together requiring relative rotation of said members to engage the same, means for restraining said members against relative rotary movement during insertion of the mandrel member into said socket member until said mandrel member has entered a predetermined distance therein, spring means actuated by insertion of said mandrel member into said socket member for storing energy therein, and means interposed between said spring and said mandrel member for converting the energy of said spring into relative rotary movement between said members.

2. In a detachable coupling, a socket member, a mandrel member receivable in said socket, interengageable means on said socket and mandrel members for holding said members coupled together requiring relative rotation of said members to engage the same, means for restraining said members against relative rotary movement during insertion of the mandrel member into said socket member until said mandrel member has entered a predetermined distance therein, spring means actuated by insertion of said mandrel member into said socket member for storing energy therein, means actuated by said spring for imparting relative rotary movement between said members, comprising a pair of cam members reciprocable relative to each other to impart rotary motion therebetween, and means connecting one of said cam members to said mandrel member and the other cam member to said socket member.

3. In a detachable coupling, a socket member, a mandrel member receivable in said socket, interengageable means on said socket and mandrel members for holding said members coupled together requiring relative rotation of said members to engage the same, said interengaging means being alignable with each other only after said mandrel member has entered a predetermined distance into said socket member, spring means actuated by insertion of said mandrel member into said socket member for storing energy therein, and means interposed between said spring and said mandrel member for converting the energy of said spring into relative rotary movement between said members when said interengaging means are aligned with each other.

4. In a detachable coupling, an elongated socket member having a longitudinal bore extending therein, a mandrel member receivable in the bore of said socket, means on said mandrel and said socket for interengaging the same to couple said mandrel and socket together when said mandrel and socket are rotated relative to each other, means for restraining said members against relative rotary movement during insertion of said mandrel member into said socket member until said mandrel member has entered a predetermined distance therein, a compression spring disposed longitudinally relative to said socket and mandrel members and compressible by insertion of said mandrel member into the bore of said socket member to store energy therein, and means interposed between said spring and said mandrel member for converting the energy stored in said spring into relative rotary movement between said socket and mandrel member when said mandrel member has been inserted to said predetermined distance.

5. In a detachable coupling, a socket member having a bore extending longitudinally thereof, a mandrel member insertable into said bore, interrupted threads on each of said mandrel and socket members interengageable upon relative rotation of said mandrel and socket members to couple said members together, the interruption of said threads on said mandrel and socket members defining interengaging grooves and shoulders preventing relative rotation of said mandrel and socket members until said mandrel has been inserted to a predetermined distance in said socket member, a helical spring disposed longitudinally relative to said socket and mandrel members and compressible by longitudinal movement of said mandrel and socket members relative to each other to store energy therein, and means interposed between said spring and said mandrel member and actuated by said spring when said mandrel has been inserted to said predetermined distance for converting the energy of said spring in relative rotary movement between said mandrel and socket members.

6. In a detachable coupling, a socket member having a bore extending longitudinally thereof, a mandrel member insertable into said bore, interrupted threads on each of said mandrel and socket members interengageable upon relative rotation of said mandrel and socket members to couple said members together, the interruption of said threads on said mandrel and socket members defining interengaging grooves and shoulders preventing relative rotation of said mandrel and socket members until said mandrel has been inserted to a predetermined distance in said socket member, a helical spring disposed longitudinally relative to said socket and mandrel members and compressible by longitudinal movement of said mandrel and socket members relative to each other to store energy therein, a pair of cam members telescopically assembled together and having cam faces thereon for causing relative rotary movement of said cam members upon telescopic movement therebetween, said cam members being interposed between said mandrel member and said socket member, means fixing one of said cam members against rotation relative to said socket member, releasable means fixing the other of said cam members against rotation relative to said socket member until said mandrel member has been inserted in said socket member to a predetermined distance whereby the forces stored in said spring will cause relative movement between said cam members to rotate said socket and mandrel members into coupling engagement with each other.

7. In a detachable coupling, a socket member having a bore, a mandrel member insertable in said bore, cooperating means on said socket and mandrel members for interengagement upon insertion of said mandrel member into said socket member to a predetermined distance and then upon relative rotation of said socket and mandrel members, said means including a groove on said socket member for guiding said mandrel member during insertion thereof, a driver cam disposed in said socket member having means thereon to engage said mandrel member, said driver cam being normally disposed in said groove to prevent rotation thereof relative to said socket member, a torsion cam associated with said driver cam and tending to cause relative rotation of said driver cam and socket member upon longitudinal movement of said driver cam and torsion cam relative to each other, a compression spring in said socket member normally urging said cam members downwardly in said bore and compressible upon the lifting of said cam members as said mandrel member is inserted in said bore to store energy in said spring to move said cam members longitudinally relative to each other upon the penetration of said mandrel member into said bore to a predetermined distance.

8. In a detachable coupling, a socket member having a longitudinal bore extending therein, a mandrel member receivable in said bore, interengaging means on said mandrel and said socket member and actuated upon relative rotation between said mandrel and socket members for coupling said members together, a driving means engageable with said mandrel member for rotating said mandrel and socket members relative to each other, a groove in said bore engageable with said driving means to prevent relative rotation between said driving means and said socket member, a recess in said bore communicating with said groove permitting rotation of said driving means relative to said socket member when said driving means has been elevated in said bore into alignment with said recess, means for exerting a force on said driving means tending to rotate the same including a compression spring normally urging said driving means downwardly in said bore and compressible by elevation of said driving means upon insertion of said mandrel member into said socket member to store energy in said spring and means coupled to said driving means for converting the energy of said spring into rotary movement of said driving means whereby upon elevation of said mandrel member into alignment with said recess said spring will rotate said driving means relative to said socket member.

9. In a detachable coupling, a socket member, a mandrel member receivable in said socket, interrupted threads on said socket member and said mandrel member interengageable to permit longitudinal movement of said mandrel member and said socket member until said threads are aligned with each other and then interengageable by relative rotary movement between said socket member and mandrel member to couple said members together, means for imparting a relative rotary movement between said socket and mandrel members including a driving means engageable with said socket and slidable longitudinally in said socket, a compression spring disposed above said driving means and adapted to be compressed by movement of said driving means longitudinally of said socket means as said mandrel member is inserted therein, and cam means interposed between said driving means and said spring for rotating said driving means when said mandrel has been inserted into said socket to a position aligning said threads relative to each other.

10. In a detachable coupling, a socket member, a mandrel member receivable in said socket member, interengageable coupling means on said socket and mandrel members actuated by rotary movement of said socket and mandrel members relative to each other for coupling said mandrel and socket members together, a compression spring actuated by insertion of said mandrel member into said socket member to store energy therein, and means interposed between said spring and said mandrel member and actuated solely by converting the energy thereof into rotary movement of said spring for said mandrel and socket members relative to each other to interengage said coupling means.

11. In a detachable coupling, a socket member having a longitudinal bore extending therein, a mandrel member receivable in said bore of said socket member, interrupted threads on said mandrel and socket members permitting longitudinal movement of said members relative to each other to align said threads and interengageable with each other upon rotary movement of said mandrel and socket members relative to each other, means for imparting relative rotary movement to said socket and mandrel members including a driver cam having means thereon to engage said mandrel member, a torsion cam associated with said driver cam for imparting rotary movement thereto, a compression spring disposed above said torsion cam and compressible by lifting movement of said torsion and driving cams upon insertion of said mandrel into said socket member for storing energy therein to cause rotary movement of said socket and mandrel members when said threads are aligned with each other.

12. In a detachable coupling, a socket member having a longitudinal bore extending therein, a mandrel member receivable in said bore of said socket member, interrupted threads on said mandrel and socket members permitting longitudinal movement of said members relative to each other to align said threads and interengageable with each other upon rotary movement of said mandrel and socket members relative to said socket and mandrel members including a driver cam having means thereon for engaging said mandrel member, a torsion cam telescopically assembled upon said driver cam, said cams having faces thereon for imparting rotary movement between said cams upon longitudinal movement of said cams relative to each other, means normally disposing said cams in extended position relative to each other, a compression spring disposed above said torsion cam and adapted to be compressed by longitudinal movement of said cams in said socket member as said mandrel is inserted therein to store energy in said spring whereby when said threads are aligned with each other the energy stored in said spring will rotate said mandrel and socket members relative to each other.

GLYNN H. WILLIAMS.